(12) United States Patent
Brundidge et al.

(10) Patent No.: US 10,628,070 B2
(45) Date of Patent: Apr. 21, 2020

(54) SELECTING AND COMPRESSING TARGET FILES TO OBTAIN ADDITIONAL FREE DATA STORAGE SPACE TO PERFORM AN OPERATION IN A VIRTUAL MACHINE

(71) Applicant: Lenovo Enterprise Solutions (Singapore) Pte. Ltd., Singapore (SG)

(72) Inventors: Jimmie Lee Brundidge, Raleigh, NC (US); James Gordon McLean, Raleigh, NC (US); John Joseph Hedderman, Raleigh, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 213 days.

(21) Appl. No.: 15/925,353

(22) Filed: Mar. 19, 2018

(65) Prior Publication Data
US 2019/0286354 A1    Sep. 19, 2019

(51) Int. Cl.
*G06F 9/455* (2018.01)
*G06F 3/06* (2006.01)

(52) U.S. Cl.
CPC .......... *G06F 3/0643* (2013.01); *G06F 3/0652* (2013.01); *G06F 3/0653* (2013.01); *G06F 9/45558* (2013.01); *G06F 2009/45583* (2013.01)

(58) Field of Classification Search
None
See application file for complete search history.

*Primary Examiner* — Gregory A Kessler
(74) *Attorney, Agent, or Firm* — Jeffrey L. Streets (57) ABSTRACT

An apparatus and computer program product include non-transitory computer readable storage media having program instructions executable by a processor to detect that an operation to be performed in a virtual machine needs more data storage space than the current amount of free data storage space available to the virtual machine. Target files are selected, compressed and stored, and the target files are deleted to obtain additional data storage space to support the operation. In response to completion of the operation, temporary files used by the operation are deleted, the compressed files are decompressed, the decompressed target files are stored, and the compressed files are deleted.

20 Claims, 6 Drawing Sheets

SELECTING AND COMPRESSING TARGET FILES TO OBTAIN ADDITIONAL FREE DATA STORAGE SPACE TO PERFORM AN OPERATION IN A VIRTUAL MACHINE

BACKGROUND

The present disclosure relates to virtualization of resources in a computer system and the use of a hypervisor to implement a virtual machine.

BACKGROUND OF THE RELATED ART

In a cloud computing environment, a user may be assigned a virtual machine somewhere in the computing cloud. The virtual machine provides the software operating system and has access to physical resources, such as input/output bandwidth, processing power and memory capacity, to support the user's application. Provisioning software manages and allocates virtual machines among the available computer nodes in the cloud and will designate an amount of each physical resource may be used by each virtual machine. However, the amount of these physical resources is not easily changed once the VM is established. Each virtual machine runs independent of other virtual machines, such that multiple operating system environments can coexist on the same physical computer system in complete isolation from each other.

BRIEF SUMMARY

One embodiment provides a computer program product comprising non-transitory computer readable storage media having program instructions embodied therewith. The program instructions are executable by a processor to detect that an operation to be performed in a virtual machine has a required amount of data storage space that is greater than a current amount of free data storage space available to the virtual machine but less than a total amount of data storage space allocated to the virtual machine. The program instructions are further executable by the processor to select a plurality of target files that are stored in the data storage space allocated to the virtual machine, and then compress the target files to obtain additional free data storage space, store the compressed files in the data storage space allocated to the virtual machine and delete the target files from the data storage space allocated to the virtual machine. Still further, the program instructions are executable by the processor to perform the operation in the virtual machine using the additional free data storage space to store temporary files used by the operation. The program instructions are further executable by the processor to, in response to completion of the operation, delete the temporary files used by the operation from the data storage space allocated to the virtual machine, decompress the compressed files, store the decompressed target files in the data storage space allocated to the virtual machine, and delete the compressed files from the data storage space allocated to the virtual machine.

Another embodiment provides an apparatus comprising at least one storage device for storing program instructions and at least one processor for executing the program instructions. The program instructions are executable by the at least one processor to detect that an operation to be performed in a virtual machine has a required amount of data storage space that is greater than a current amount of free data storage space available to the virtual machine but less than a total amount of data storage space allocated to the virtual machine. The program instructions are further executable by the at least one processor to select a plurality of target files that are stored in the data storage space allocated to the virtual machine, and then compress the target files to obtain additional free data storage space, store the compressed files in the data storage space allocated to the virtual machine and delete the target files from the data storage space allocated to the virtual machine. Still further, the program instructions are executable by the at least one processor to perform the operation in the virtual machine using the additional free data storage space to store temporary files used by the operation. The program instructions are further executable by the at least one processor to, in response to completion of the operation, delete the temporary files used by the operation from the data storage space allocated to the virtual machine, decompress the compressed files, store the decompressed target files in the data storage space allocated to the virtual machine, and delete the compressed files from the data storage space allocated to the virtual machine.

DETAILED DESCRIPTION

One embodiment provides a computer program product comprising non-transitory computer readable storage media having program instructions embodied therewith. The program instructions are executable by a processor to detect that an operation to be performed in a virtual machine has a required amount of data storage space that is greater than a current amount of free data storage space available to the virtual machine but less than a total amount of data storage space allocated to the virtual machine. The program instructions are further executable by the processor to select a plurality of target files that are stored in the data storage space allocated to the virtual machine, and then compress the target files to obtain additional free data storage space, store the compressed files in the data storage space allocated to the virtual machine and delete the target files from the data storage space allocated to the virtual machine. Still further, the program instructions are executable by the processor to perform the operation in the virtual machine using the additional free data storage space to store temporary files used by the operation. The program instructions are further executable by the processor to, in response to completion of the operation, delete the temporary files used by the operation from the data storage space allocated to the virtual machine, decompress the compressed files, store the decompressed target files in the data storage space allocated to the virtual machine, and delete the compressed files from the data storage space allocated to the virtual machine.

The processor is a component of a computing node, such as a server. The program instructions that are executable by a processor may be executable by multiple processors within the computing node. Furthermore, the program instructions of various embodiments described herein may be included in the program instructions of a hypervisor. A hypervisor, which may also be referred to as a virtual machine monitor, is the logic that creates and runs virtual machines on the host computing node. Such hypervisor may be implemented in software, firmware or hardware.

The program instructions may be further executable by a processor to determine a total amount of data storage space of the target files that should be compressed in order for the current amount of free data storage space available to the virtual machine to exceed the require amount of data storage space for the operation. Making this determination facilitates some planning about the volume of target files, and perhaps which files or which one or more type of files, to be compressed. For example, the program instructions may be further executable by a processor to determine, prior to compressing any of the target files, that the identified plurality of target files exceed the determined total amount of data storage space of the target files that should be compressed. When the data storage space of the identified target files exceed the amount of data storage space of the target files that should be compressed, then the process may proceed with compression with some a high degree of probability that the data compression will result in sufficient free data storage space to enable the operation to be performed in the virtual machine, where the additional free data storage space made available through data compression may be used to store temporary files used by the operation.

In one non-limiting example, a total amount of data storage space of the target files that should be compressed may be determined using an estimated compression ratio. The estimated compression ratio may be a single fixed estimate or average of compression ratios, or the estimated compression ratio may be an estimate based on experience with data compression of files of the same type(s) as the target files. Still further, the estimated compression ratio may be based on a data compression test using a subset of the target files. A "compression ratio" is equal to an uncompressed data size divided by a resulting compressed data size (i.e., uncompressed size/compressed size). According, a "space savings" is equal to 1−(compressed size/uncompressed size).

With an estimated compression ratio having been obtained, the total amount of data storage space of the target files that should be compressed may be estimated by the equation:

$$TA=(RA-CF)/(1-1/CR)$$

where:

TA is the total amount of data storage space of the target files that should be compressed;

RA is the amount of data storage space required by the operation;

CF is the current amount of free data storage space available to the virtual machine; and CR is the estimated compression ratio.

Embodiments may be implemented to facilitate any type of operation that may be performed by a virtual machine. However, since the tasks of data compression and data decompression require computing resources, embodiments are preferably implemented to facilitate only occasional or periodic operations that are not one of the virtual machine's ongoing or primary tasks. For example, the operation may be selected from the group consisting of a deployment of an operating system, an application update, and a performance tuning operation. In one optional implementation, the hypervisor may receive a request to perform the operation in the virtual machine. Such request may come from the virtual machine, an application running in the virtual machine, or the operation to be performed in the virtual machine. Furthermore, the request may identify the amount of data storage space that the operation requires, such as to store temporary files in support of the operation. The hypervisor may already have access to, or may obtain, the current amount of free data storage space available to the virtual machine, the total amount of data storage space allocated to the virtual machine, and a list of files stored in the data storage space allocated to the virtual machine.

In further embodiments, the program instructions may be further executable by the processor to identify inactive files stored in the data storage space allocated to the virtual machine. Accordingly, the plurality of target files may be selected from the identified inactive files. Non-limiting examples of the inactive files may be selected from the group consisting of initial setup files, installation files, backup copies of files, unused graphic files, and combinations thereof. In one alternative, the inactive files may include any files unrelated to the ongoing operation of the virtual machine. In a separate alternative, the inactive files may include any files which have not been accessed since a current set of users have logged in to an application running in the virtual machine. In still other embodiments, the inactive files may include other files, such as files that are intentionally made to be inactive by disabling one or more function of an application running in the virtual machine.

In another embodiment, the program instructions are further executable by the processor to disable one or more of the functions of the application running in the virtual machine prior to compressing the target files. Accordingly, files supporting the one or more disabled functions may be included in the selected plurality of target files that may be compressed. Then, after the operation has completed and the target files have been decompressed, the one or more disabled functions of the application may be re-enabled.

In yet another embodiment, the program instructions are further executable by the processor to modify one or more of the functions of the application running in the virtual machine prior to compressing the target files. Accordingly, files that are no longer necessary to support the one or more modified functions may be included in the selected plurality of target files that may be compressed. Then, after the operation has completed and the target files have been decompressed, the one or more modified functions of the application running in the virtual machine may be restored to their original pre-modified condition.

In a still further embodiment, the program instructions are further executable by the processor to store a snapshot of the state of the application running in the virtual machine prior to compressing the target files. Accordingly, any one or more files supporting the application may be included in the selected plurality of target files that may be compressed. Then, after the operation has completed and the target files have been decompressed, the state of the application running in the virtual machine may be restored using the stored snapshot.

Embodiments may also include program instructions that are executable by the processor to detect that one or more of the compressed files was not successfully decompressed. In this situation, the one or more files that are unsuccessfully decompressed must be replaced. Accordingly, the program instructions may be executable by the processor to generate output notifying a user to download a replacement file.

The data storage space allocated to the virtual machine may be a portion of any one or more type of data storage device. For example, the data storage space may be a portion of a data storage device selected from the group consisting of a hard disk drive, solid state memory, and combinations thereof. Furthermore, the data storage device may be a data storage array, such as a redundant array of independent disks (RAID) system.

In one practical example of an embodiment, an instance of the Lenovo XClarity Administrator may be currently running in a virtual machine that currently has free data storage space of 3 GB. However, it is desired to perform an operation to import and deploy an update package totaling 4 GB in size. The filesystem of the virtual machine is scanned to identify files which have not been accessed since the creation of the virtual machine. Examples of such files include, without limitation, installation files, backup copies of files, unused graphic files, or other "left-over" files unrelated to the ongoing operation of the virtual machine. Once these files are identified, any or all of the identified files may be run through a compression process, perhaps resulting in a compressed repository (such as a .TAR or .ZIP file). After the compression process has been completed for each file, the original file may be erased. Since the compressed files require less data storage space than the original (uncompressed) files, the amount of free data storage space available to the virtual machine will have increased according to a data compression ratio. This additional amount of free data storage space may then be used to perform the desired operation (such as the download and deployment of the 4 GB update package). Once the desired operation has been completed, the temporary files related to the desired operation may be deleted. The compressed files may then be decompressed and the repository of compressed files may be deleted. Accordingly, this process may return the virtual machine filesystem to its original state, while having accommodated the desired operation.

Another embodiment provides an apparatus comprising at least one storage device for storing program instructions and at least one processor for executing the program instructions. The program instructions are executable by the at least one processor to detect that an operation to be performed in a virtual machine has a required amount of data storage space that is greater than a current amount of free data storage space available to the virtual machine but less than a total amount of data storage space allocated to the virtual machine. The program instructions are further executable by the at least one processor to select a plurality of target files that are stored in the data storage space allocated to the virtual machine, and then compress the target files to obtain additional free data storage space, store the compressed files in the data storage space allocated to the virtual machine and delete the target files from the data storage space allocated to the virtual machine. Still further, the program instructions are executable by the at least one processor to perform the operation in the virtual machine using the additional free data storage space to store temporary files used by the operation. The program instructions are further executable by the at least one processor to, in response to completion of the operation, delete the temporary files used by the operation from the data storage space allocated to the virtual machine, decompress the compressed files, store the decompressed target files in the data storage space allocated to the virtual machine, and delete the compressed files from the data storage space allocated to the virtual machine.

The foregoing apparatus may further include program instructions executable by the at least one processor to implement or initiate any one or more aspects of the methods or computer program products described herein. Accordingly, a separate description of the methods and computer program products will not be duplicated in the context of an apparatus of a system including the apparatus.

Figure 1:
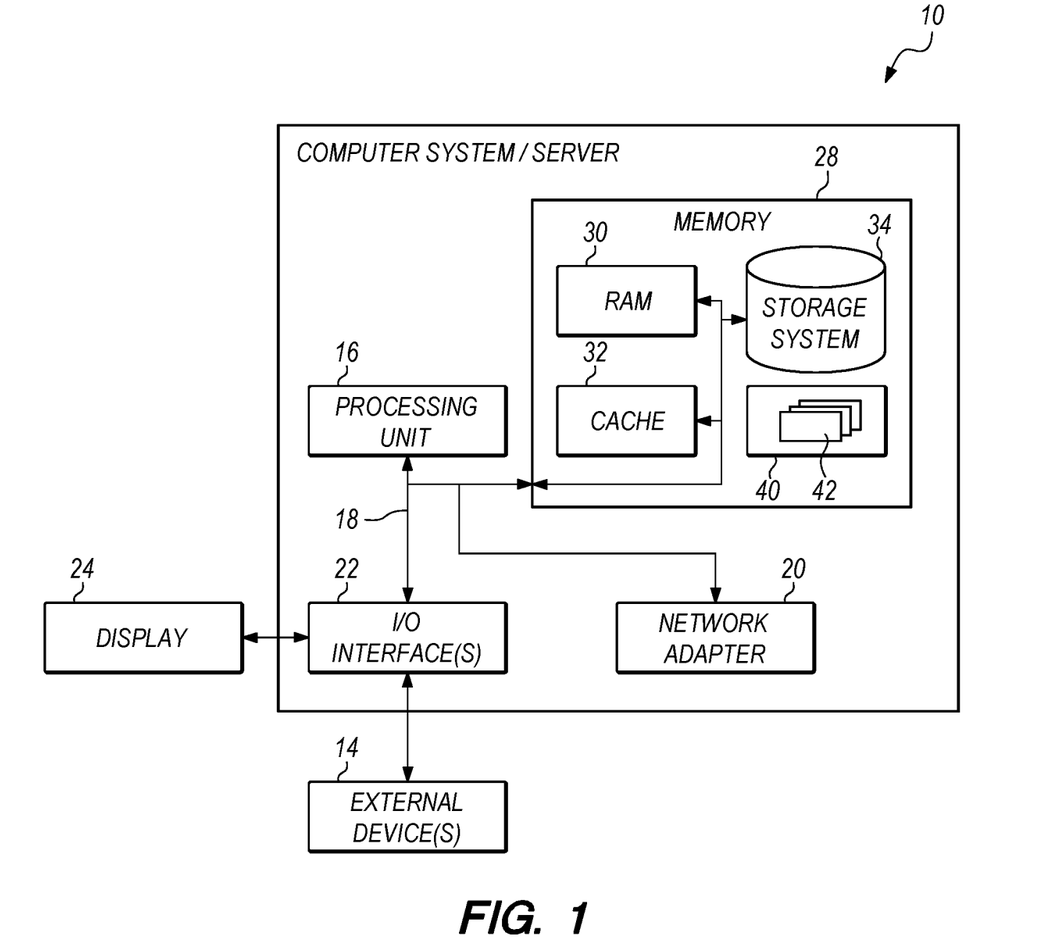
FIG. 1 is a diagram of an individual computing node.

FIG. 1 is a diagram of an individual computing node 10. The computing node 10 is a non-limiting example of a computing node suitable for use in cloud computing. The computing node 10 may be a server having any form factor, configuration or functionality. For example, the computing node may be a blade server that operates in a blade server chassis along with other blade servers that share certain infrastructure and support modules.

The computing node 10 in FIG. 1 includes at least one processor or processing unit 16, system memory 28, a network adapter 20, an input/output interface 22, and a bus 18 that enables the processing unit to communicate with system memory, network adapter and input/output interface. The bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The system memory 28 may include any computer readable storage media, such as random access memory (RAM) 30 or cache memory 32. The computing system 10 may further include any other removable/non-removable or volatile/non-volatile computer readable storage media. By way of example only, a storage system 34 may include non-removable, non-volatile magnetic media (such as a "hard drive") or solid state media (such as a "flash memory"). Furthermore, the memory 28 may include a magnetic disk drive for reading from or writing to a removable magnetic disk (e.g., a "floppy disk"), an optical disk drive for reading from or writing to a removable non-volatile optical disk (e.g., a CD-ROM, DVD-ROM or other optical media). Optionally, each memory device may be connected to bus 18 by one or more data media interfaces. The memory 28 may store at least one computer program product including program instructions executable by the processing unit 16 to perform an embodiment described herein. For example, the memory 28 may store one or more application 40, such as an operating system, hypervisor and/or user application, having a set of functions or program modules 42.

Optionally, the computing node 10 may also communicate with one or more external devices 14, such as a keyboard, a pointing device, and/or a display 24. Furthermore, the computing node 10 may communicate with one or more other computing nodes or network devices (not shown) using the network adapter 20, which is connected to the processing unit 16 via the system bus 18. It should be understood that other hardware and/or software components, not shown, may be used in conjunction with the computing node 10.

Figure 2:
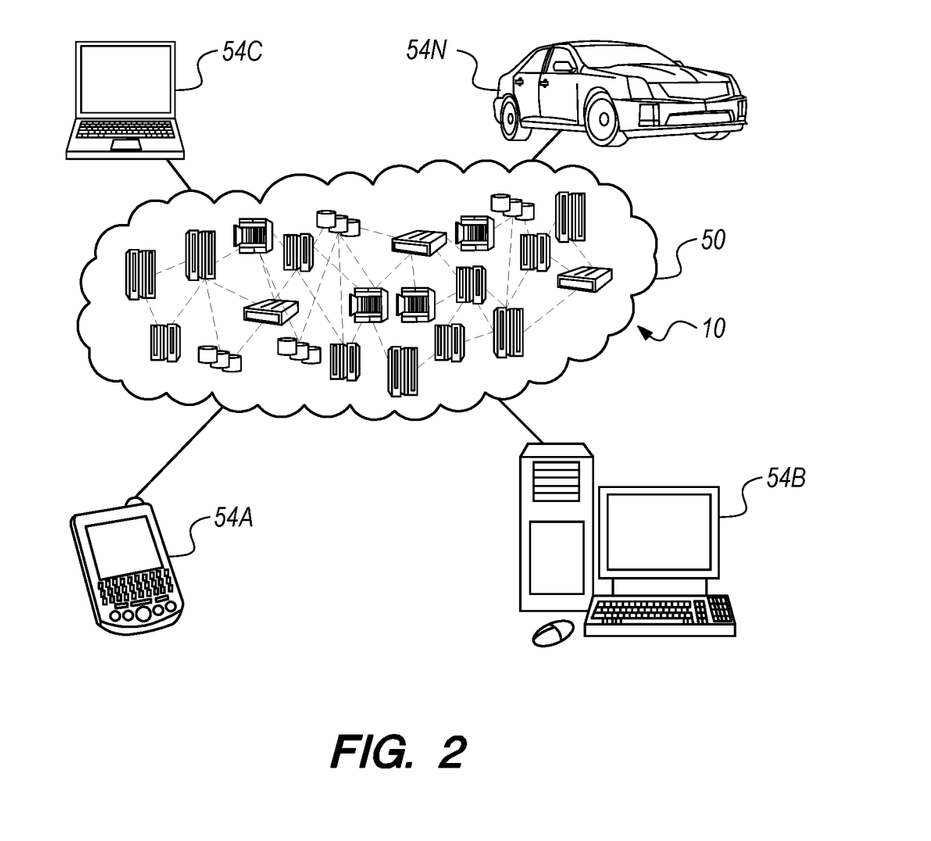
FIG. 2 is a diagram illustrating various user's computing devices in communication with a cloud computing environment having many cloud computing nodes.

FIG. 2 is a diagram illustrating various computing devices in communication with a cloud computing environment 50 including many computing nodes 10. As shown, the cloud computing environment 50 comprises a plurality of computing nodes 10 available for communication with various local computing devices used by cloud consumers. For example, the local computing device may be a personal digital assistant (PDA) or mobile communication device 54A, desktop computer 54B, laptop computer 54C, and/or automobile computer system 54N. Furthermore, the computing nodes 10 may communicate with one another, either directly or indirectly, and may be grouped physically or virtually, in one or more networks, such as a private, community, public, or hybrid cloud. This allows cloud computing environment 50 to offer infrastructure, platforms and/or software as services to the local computing devices. It is understood that the types of computing devices 54A-N shown in FIG. 2 are intended to be illustrative only and that computing nodes 10 and cloud computing environment 50 can communicate with any type of computerized device or system over any type of network and/or network addressable connection. Other examples of the local computing device include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Figure 3:
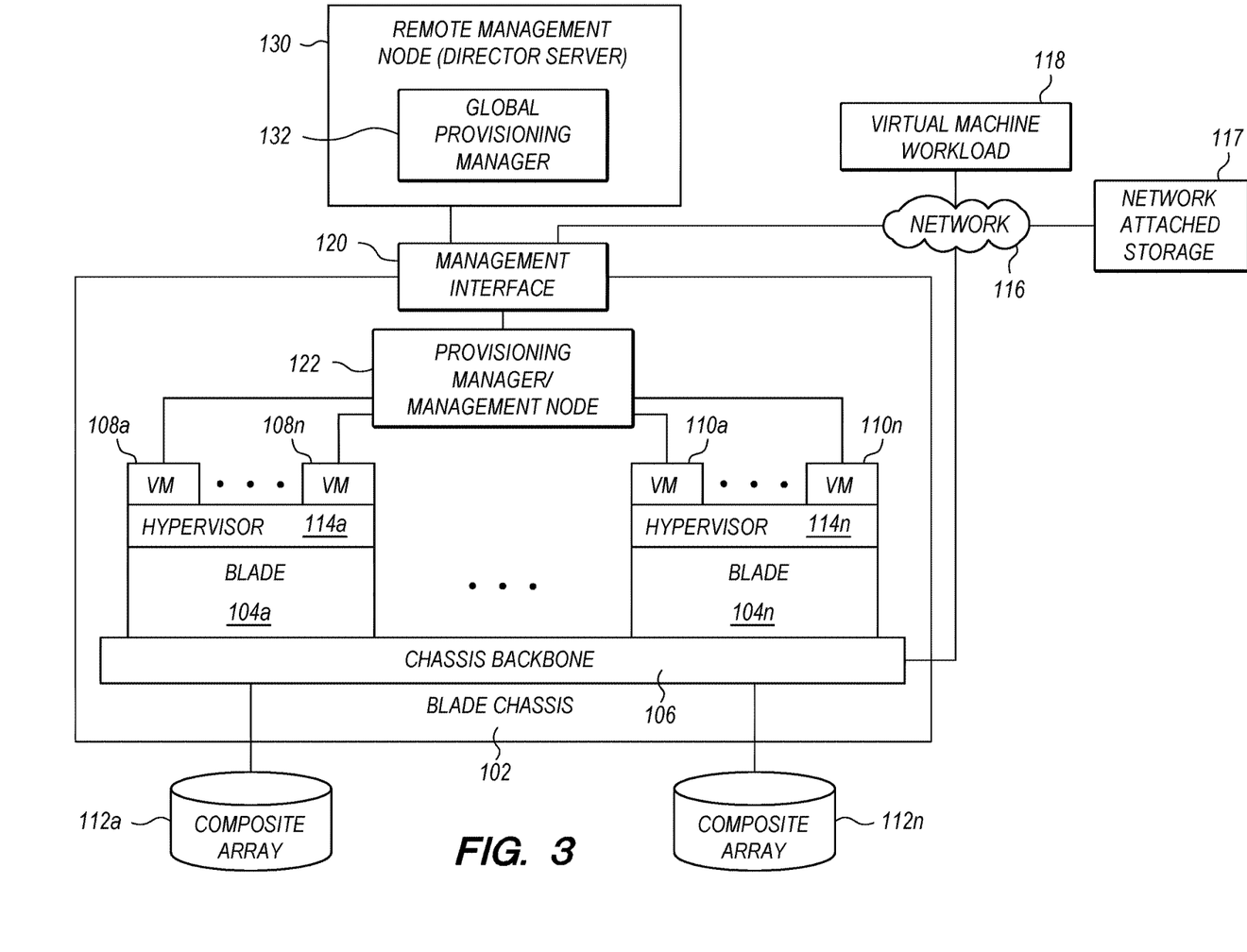
FIG. 3 is a diagram of a system in which a blade chassis supports multiple computing nodes that each run multiple virtual machines.

FIG. 3 is a diagram of a system in which a blade chassis 102 supports multiple computing nodes that each run multiple virtual machines. The exemplary blade chassis 102 may operate in a "cloud" environment to provide a pool of resources. The blade chassis 102 comprises a plurality of computing nodes, referred to as blade servers 104a-n (where "a-n" indicates an integer number of blade servers), coupled to a chassis backbone 106. Each blade server supports one or more virtual machines (VMs). A virtual machine is a software implementation (emulation) of a physical computer. A single hardware computing node, such as a blade server, can support multiple virtual machines, each virtual machine running the same, different, or shared operating systems. In one embodiment, each virtual machine can be specifically tailored and reserved for executing software tasks: (1) of a particular type (e.g., database management, graphics, word processing etc.); (2) for a particular user, subscriber, client, group or other entity; (3) at a particular time of day or day of week (e.g., at a permitted time of day or schedule); etc.

As shown in FIG. 3, a first blade server 104a supports VMs 108a-n (where "a-n" indicates an integer number of VMs), and another blade server 104n supports VMs 110a-n (wherein "a-n" indicates an integer number of VMs). The blade servers 104a-n are coupled to one or more internal or external storage devices 112a-n that provide a hypervisors 114a-n, as well as guest operating systems (not shown) and applications (not shown) that run in the VMs. Optionally, the guest operating systems or applications may be located remotely in the network 116 and transmitted from the network attached storage 117 to one of the storage devices 112a-n over the network as needed. The global provisioning manager 132 running on the remote management node (Director Server) 130 may be responsible for directing the appropriate software to each blade server via a management interface 120 and a blade chassis provisioning manager 122.

The chassis backbone 106 may also be coupled to the network 116, which may be a public network (e.g., the Internet) or a private network (e.g., a virtual private network or an internal hardware network). The network connection to the chassis backbone 106 permits a virtual machine workload 118 to be communicated to a management interface 120 of the blade chassis 102. This virtual machine workload 118 is a software task that may be executed on any of the VMs within the blade chassis 102 using the resources allocated to the VM. After receipt of a workload 118, the management interface 120 transmits the workload request to a provisioning manager/management node 122, which is hardware and/or software logic capable of configuring VMs on one of the blade servers 104a-n within the blade chassis 102 to execute the requested software task.)

The blade chassis 102 is just one example of a computer environment in which the presently disclosed methods can operate. However, the scope of the presently disclosed apparatus is limited to a blade chassis. That is, the presently disclosed methods and computer program products can also be used in any computer environment that utilizes some type of workload management or resource provisioning, as described herein.

Figure 4A:
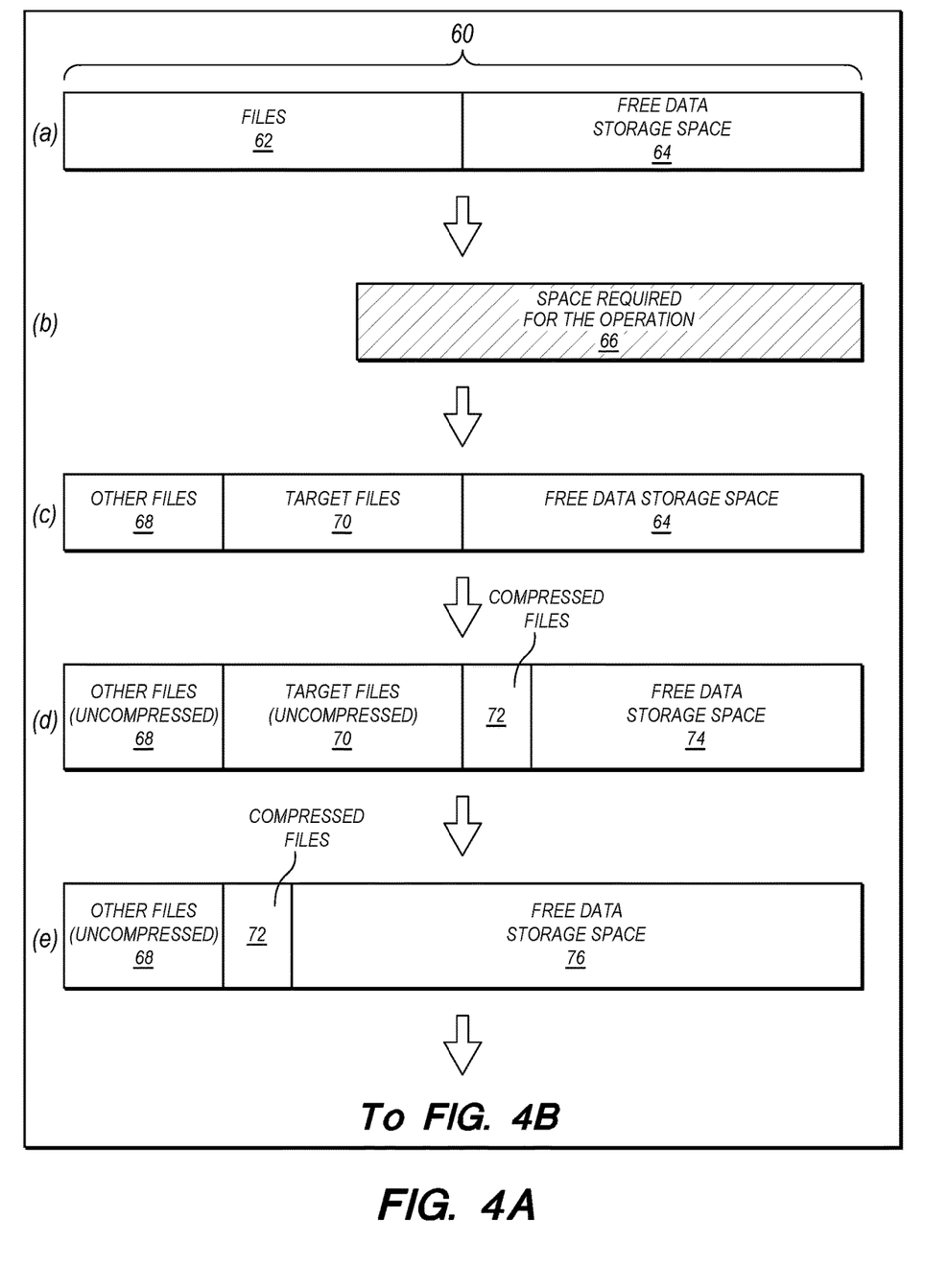
FIGS. 4A and 4B provide a series of illustrations representing the data storage space allocated to a particular virtual machine.
Figure 4B:
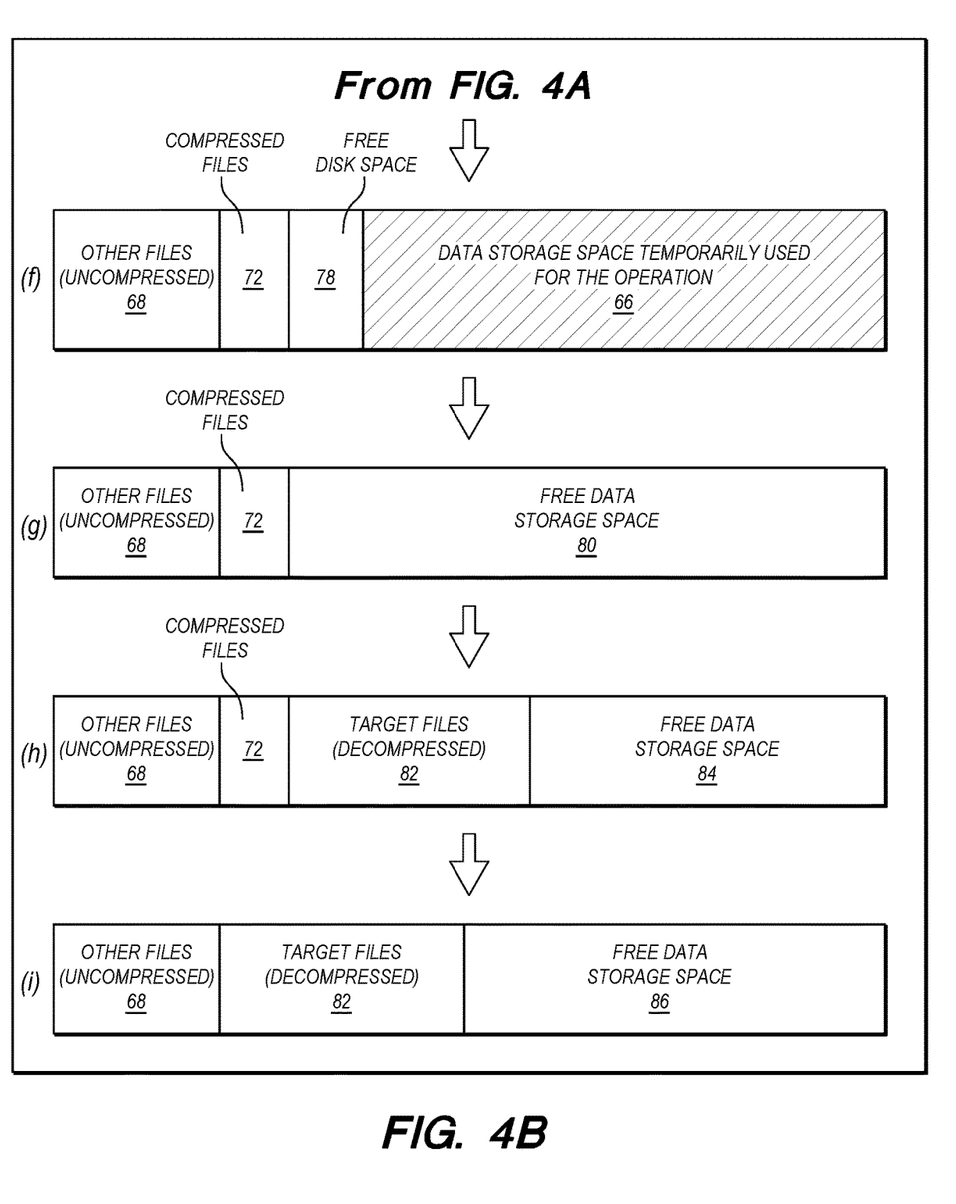

FIGS. 4A and 4B provide a series of illustrations representing the data storage space allocated to a particular virtual machine. The two Figures are separated into a series of lines (a) through (i), each line representing an amount of data storage space as described below.

In line (a), a total amount of data storage space allocated to a virtual machine is represented as a rectangular area (data storage space 60). At any point in time during the use of the virtual machine, some of the data storage space 60 stores files 62 and some of the data storage space 60 is free data storage space 64, which is available to stored additional files without requiring deletion of data.

Line (b) illustrates an amount of data storage space that is required to perform a desired operation on the virtual machine. The operation may, for example, be an update to an operating system or application running in the virtual machine. However, the performance of the operation requires an amount of data storage space 66 that exceeds the current amount of free data storage space 64 (see line (a)) available to the virtual machine.

So, in accordance with one embodiment, a hypervisor that is responsible for managing the virtual machine may take various actions to prepare for the operation. In line (c), the files 62 are scanned or examined to identify a set of target files 70 that meet certain criteria, such as that the files have been inactive for some period of time or are a file type that is no longer needed. While there may also be some other files 68 that are active, the target files 70 are identified as files that may be temporarily compressed without preventing a necessary function or operation of the virtual machine.

In line (d), the target files 70 are compressed (i.e., go through a process of data compression) to form compressed files 72. During this process, the other files 68 are still "uncompressed" and the amount of free data storage space 74 may be less than the initial free data storage space 64.

However, in line (e), the uncompressed target files 70 have been deleted. Accordingly, an amount of free data storage space 76 available to the virtual machine has grown substantially. Of course, the amount of data storage space that is made available by data compression of the target files may vary as a function of the type and size of the target files, as well as the nature of the data compression operation.

In FIG. 4B, the process continues in line (f) where the operation has stored temporary files that require the amount of data storage space 66. Since the data storage space allocated to the virtual machine still stores the other files 68 and the compressed files 72, this leaves only a small amount of free data storage space 78. However, the virtual machine is able to accommodate the temporary files required by the operation.

In line (g), the operation has completed and the temporary files that were required for the performance of the operation (see data storage space 66 in line (f)) have been deleted. This leaves an amount of free data storage space 80.

In line (h), the compressed files 72 are decompressed (i.e., go through a process of data decompression) to form decompressed target files 82, which should require the same amount of data storage space as the original (uncompressed) target files 70. As a result of storing the decompressed target files 82, the amount of free data storage space has been reduced to the free data storage space 84.

In line (i), the compressed files 72 have been deleted. Accordingly, the other files 68 and the decompressed target files 82 are stored on the data storage space allocated to the virtual machine, leaving the free data storage space 86. While performance of the operation may have altered the other files 68 or stored yet other files on the data storage space allocated to the virtual machine, the amount of free data storage space 86 may be the same as, or similar to, the original free data storage space 64 (see lines (a) and (c)).

Figure 5:
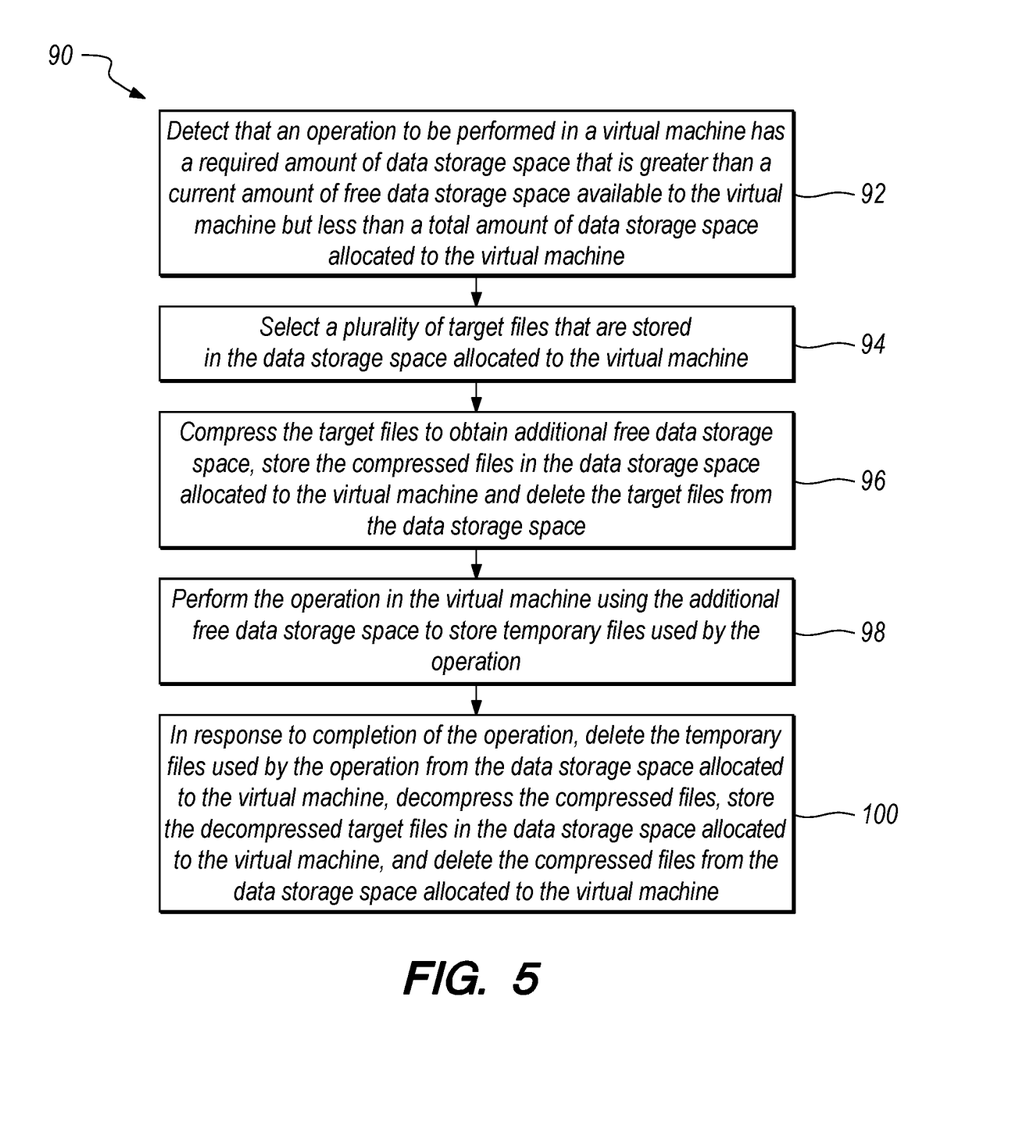
FIG. 5 is a flowchart of a method according to one embodiment.

FIG. 5 is a flowchart of a method 90 according to one embodiment. In step 92, the method detects that an operation to be performed in a virtual machine has a required amount of data storage space that is greater than a current amount of free data storage space available to the virtual machine but less than a total amount of data storage space allocated to the virtual machine. In step 94, the method selects a plurality of target files that are stored in the data storage space allocated to the virtual machine. In step 96, the method compresses the target files to obtain additional free data storage space, stores the compressed files in the data storage space allocated to the virtual machine and deletes the target files from the data storage space allocated to the virtual machine. In step 98, the method performs the operation (i.e., initiates the operation or enables the operation to begin) in the virtual machine using the additional free data storage space to store temporary files used by the operation. In step 100, the method will, in response to completion of the operation, delete the temporary files used by the operation from the data storage space allocated to the virtual machine, decompress the compressed files, store the decompressed target files in the data storage space allocated to the virtual machine, and delete the compressed files from the data storage space allocated to the virtual machine. The method may optionally include other steps or actions as described elsewhere herein.

As will be appreciated by one skilled in the art, embodiments may take the form of a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Furthermore, any program instruction or code that is embodied on such computer readable storage media (including forms referred to as volatile memory) that is not a transitory signal are, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out various operations may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments may be described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored on computer readable storage media that is not a transitory signal, such that the program instructions can direct a computer, other programmable data processing apparatus, or other devices to function in a particular manner, and such that the program instructions stored in the computer readable storage medium produce an article of manufacture.

The computer program instructions may also be loaded onto a computer, other programmable data processing apparatus, or other devices to cause a series of operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. A computer program product comprising computer readable storage media that is not a transitory signal having program instructions embodied therewith, the program instructions executable by a processor to:
   detect that an operation to be performed in a virtual machine has a required amount of data storage space that is greater than a current amount of free data storage space available to the virtual machine but less than a total amount of data storage space allocated to the virtual machine;
   select a plurality of target files that are stored in the data storage space allocated to the virtual machine;
   compress the target files to obtain additional free data storage space, store the compressed files in the data storage space allocated to the virtual machine and delete the target files from the data storage space allocated to the virtual machine;
   perform the operation in the virtual machine using the additional free data storage space to store temporary files used by the operation; and
   in response to completion of the operation, delete the temporary files used by the operation from the data storage space allocated to the virtual machine, decompress the compressed files, store the decompressed target files in the data storage space allocated to the virtual machine, and delete the compressed files from the data storage space allocated to the virtual machine.

2. The computer program product of claim 1, wherein the program instructions are further executable by a processor to:
   determine a total amount of data storage space of the target files that should be compressed in order for the current amount of free data storage space available to the virtual machine to exceed the require amount of data storage space for the operation.

3. The computer program product of claim 2, wherein the program instructions are further executable by a processor to:
   determine, prior to compressing any of the target files, that the identified plurality of target files exceed the determined total amount of data storage space of the target files that should be compressed.

4. The computer program product of claim 2, wherein the program instructions executable by a processor to determine a total amount of data storage space of the target files that should be compressed, include program instructions executable by a processor to:
   obtain an estimated compression ratio, wherein the total amount of data storage space of the target files that should be compressed is estimated by the equation:

$$TA=(RA-CF)/(1-1/CR)$$

where:
TA is the total amount of data storage space of the target files that should be compressed;
RA is the amount of data storage space required by the operation;
CF is the current amount of free data storage space available to the virtual machine; and CR is the estimated compression ratio.

5. The computer program product of claim 1, wherein the program instructions are included in the program instructions of a hypervisor.

6. The computer program product of claim 1, wherein the program instructions executable by a processor to detect that an operation to be performed in a virtual machine has a required amount of data storage space that is greater than a current amount of free data storage space available to the virtual machine but less than a total amount of data storage space allocated to the virtual machine, include program instructions executable by the processor to receive a request to perform the operation in the virtual machine, wherein the request identifies the required amount of data storage space.

7. The computer program product of claim 1, wherein the operation is an application update.

8. The computer program product of claim 1, wherein the operation is a deployment of an operating system.

9. The computer program product of claim 1, wherein the operation is a performance tuning operation.

10. The computer program product of claim 1, wherein the program instructions are further executable by the processor to:
    identify inactive files stored in the data storage space allocated to the virtual machine, wherein the plurality of target files are selected from the identified inactive files.

11. The computer program product of claim 10, wherein the inactive files are selected from the group consisting of initial setup files, installation files, backup copies of files, unused graphic files, and combinations thereof.

12. The computer program product of claim 10, wherein the inactive files include any files unrelated to the ongoing operation of the virtual machine.

13. The computer program product of claim 10, wherein the inactive files include any files which have not been accessed since a current set of users have logged in to an application running in the virtual machine.

14. The computer program product of claim 1, wherein the program instructions are further executable by the processor to:
   disable, prior to compressing the target files, one or more of the functions of the application running in the virtual machine, wherein files supporting the one or more disabled functions are included in the selected plurality of target files; and
   reenable, subsequent to decompressing the target files, the one or more of the disabled functions of the application running in the virtual machine.

15. The computer program product of claim 1, wherein the program instructions are further executable by the processor to:
   modify, prior to compressing the target files, one or more of the functions of the application running in the virtual machine, wherein files supporting the one or more modified functions are included in the selected plurality of target files; and
   restore, subsequent to decompressing the target files, the one or more of the modified functions of the application running in the virtual machine.

16. The computer program product of claim 1, wherein the program instructions are further executable by the processor to:
   store, prior to compressing the target files, a snapshot of the state of the application running in the virtual machine, wherein any one or more files supporting the application are included in the selected plurality of target files; and
   restore, subsequent to decompressing the target files, the state of the application running in the virtual machine using the stored snapshot.

17. The computer program product of claim 1, wherein the program instructions are further executable by the processor to:
   detect that decompression of one or more of the compressed files was unsuccessful; and
   generate output notifying a user to download a replacement file.

18. An apparatus, comprising:
   at least one storage device for storing program instructions; and
   at least one processor for processing the program instructions to:
   detect that an operation to be performed in a virtual machine has a required amount of data storage space that is greater than a current amount of free data storage space available to the virtual machine but less than a total amount of data storage space allocated to the virtual machine;
   select a plurality of target files that are stored in the data storage space allocated to the virtual machine;
   compress the target files, store the compressed files in the data storage space allocated to the virtual machine and delete the target files from the data storage space allocated to the virtual machine;
   perform the operation in the virtual machine using the free data storage space to store temporary files used by the operation;
   in response to completion of the operation, delete the temporary files used by the operation from the data storage space allocated to the virtual machine; and
   decompress the compressed files, store the decompressed target files in the data storage space allocated to the virtual machine, and delete the compressed files from the data storage space allocated to the virtual machine.

19. The apparatus of claim 18, the at least one processor for further processing the program instructions to:
   identify inactive files stored in the data storage space allocated to the virtual machine, wherein the plurality of target files are selected from the identified inactive files.

20. The apparatus of claim 19, the at least one processor for further processing the program instructions to:
   determine, prior to compressing any of the target files, that the identified plurality of target files exceed the determined total amount of data storage space of the target files that should be compressed.

* * * * *